Jan. 28, 1969  M. D. MARTIN  3,424,043
ROTARY DIE CUTTER
Filed Dec. 7, 1965  Sheet 1 of 3
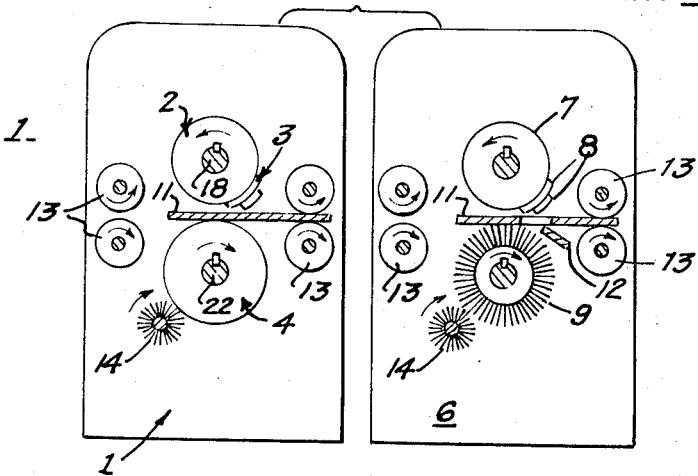
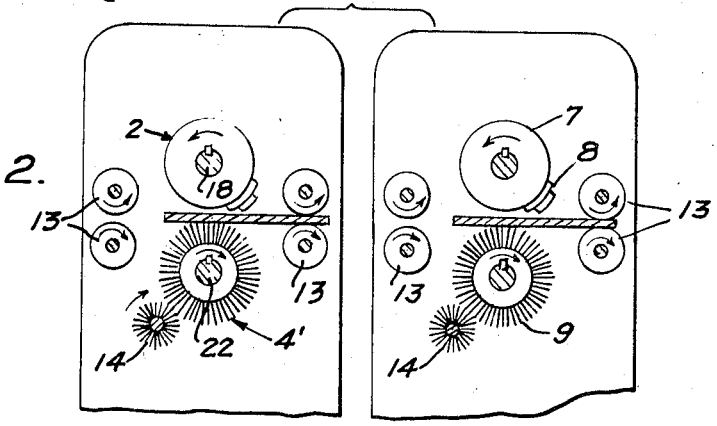
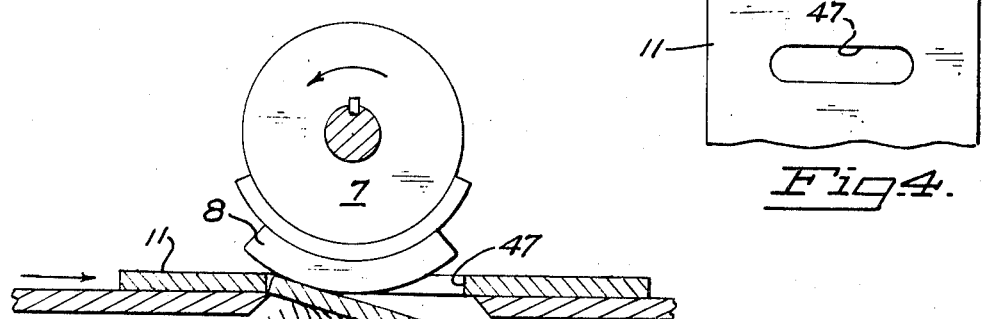
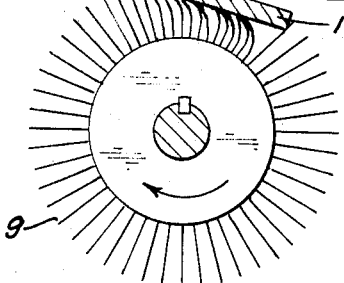
INVENTOR
MERRILL D. MARTIN
BY George B. White
ATTORNEY Jan. 28, 1969

M. D. MARTIN 3,424,043

ROTARY DIE CUTTER

Filed Dec. 7, 1965

INVENTOR
MERRILL D. MARTIN
BY
George B White
ATTORNEY

INVENTOR
MERRILL D. MARTIN
BY
*George B White*
ATTORNEY

United States Patent Office 3,424,043
Patented Jan. 28, 1969

3,424,043
ROTARY DIE CUTTER
Merrill D. Martin, 2 Mall Court,
Oakland, Calif. 94611
Filed Dec. 7, 1965, Ser. No. 521,232
U.S. Cl. 83—168
Int. Cl. B26d *1/56, 5/08, 7/08*
6 Claims

ABSTRACT OF THE DISCLOSURE

A rotary die cutter wherein the die cutting wear is distributed and spread over the periphery of an anvil roll in such manner that a very large number of impressions are made by the die cutters before an impression is repeated in the same place on the periphery of the anvil roll; this spreading of the cutting impressions is accomplished by shifting the anvil roll axially relatively to the cutter roll in a predetermined ratio relatively to the rotation of said rolls, and further spreading by a connecting gearing of non-reducible ratio between the cutting roll shaft and the anvil roll shaft, thereby prolonging the life of the anvil roll.

Brief description of the invention

In a rotary die cutter, a pair of boxed frames, a cutter roll and a parallel anvil roll journalled between the frames; a cutting die is mounted on the cutter roll and the anvil roll has a resiliently yieldable periphery; transmission gearing between driving and driven gears connecting the cutter roll shaft with the anvil roll shaft; a shifting driving gear driven by said transmission gearing and a shifting driven gear rotatable on the anvil roll shaft held against axial movement and forming a cam groove, the rise of the cam groove being offset axially of the anvil roll shaft so that a follower fixably held on the anvil roll shaft and riding in said cam groove reciprocates the anvil roll shaft and the anvil axially relatively to the cutter roll thereby to offset successive cutting impressions on the anvil roll periphery; the transmission gearing between the driving and driven gears including a chain of driven and driving gears, the ratio between the product of multiplying the number of teeth of the driving gear by the number of teeth of the driving transmission gears and the ratio between the product of multiplying the number of teeth of the driven gear by the number of teeth of the driven transmission gears being non-reducible thereby to further offset successive cutting impressions on the periphery of the anvil roll.

Description of figures

FIG. 1 is a diagrammatic view of the rotary cutter and the rotary stripper in line.

FIG. 2 is the rotary cutter and rotary stripper in line shown diagrammatically wherein such anvil roll is formed as a cylindrical brush.

FIG. 3 is a detailed sectional view on an enlarged scale illustrating the operation of the stripping action.

FIG. 4 is a fragmental plan view of the sheet with a cutout hole or slot.

Detailed description

Figure 5:
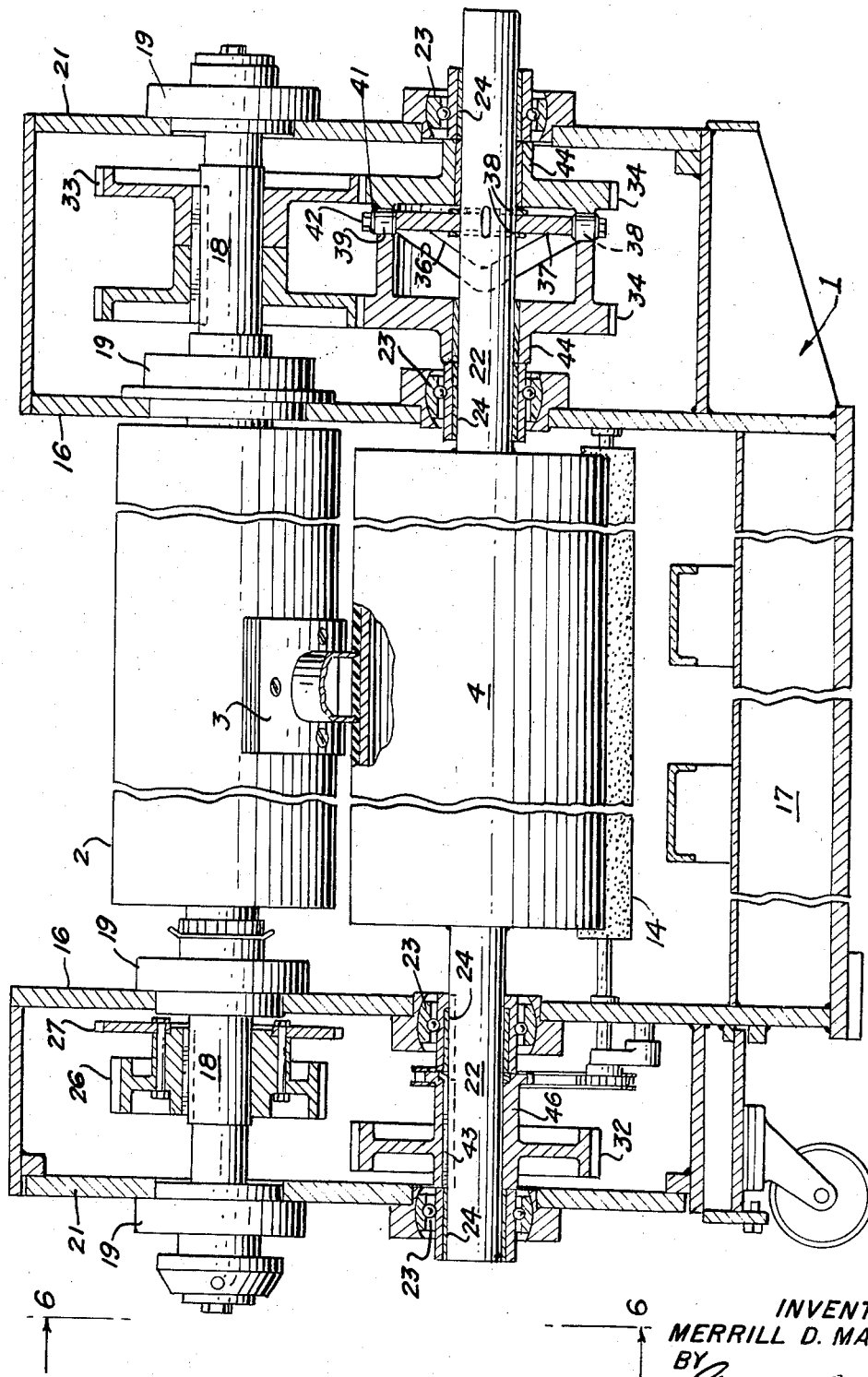
FIG. 5 is a sectional assembly view of the rotary cutter device, taken on lines 5—5 of FIG. 6.
Figure 6:
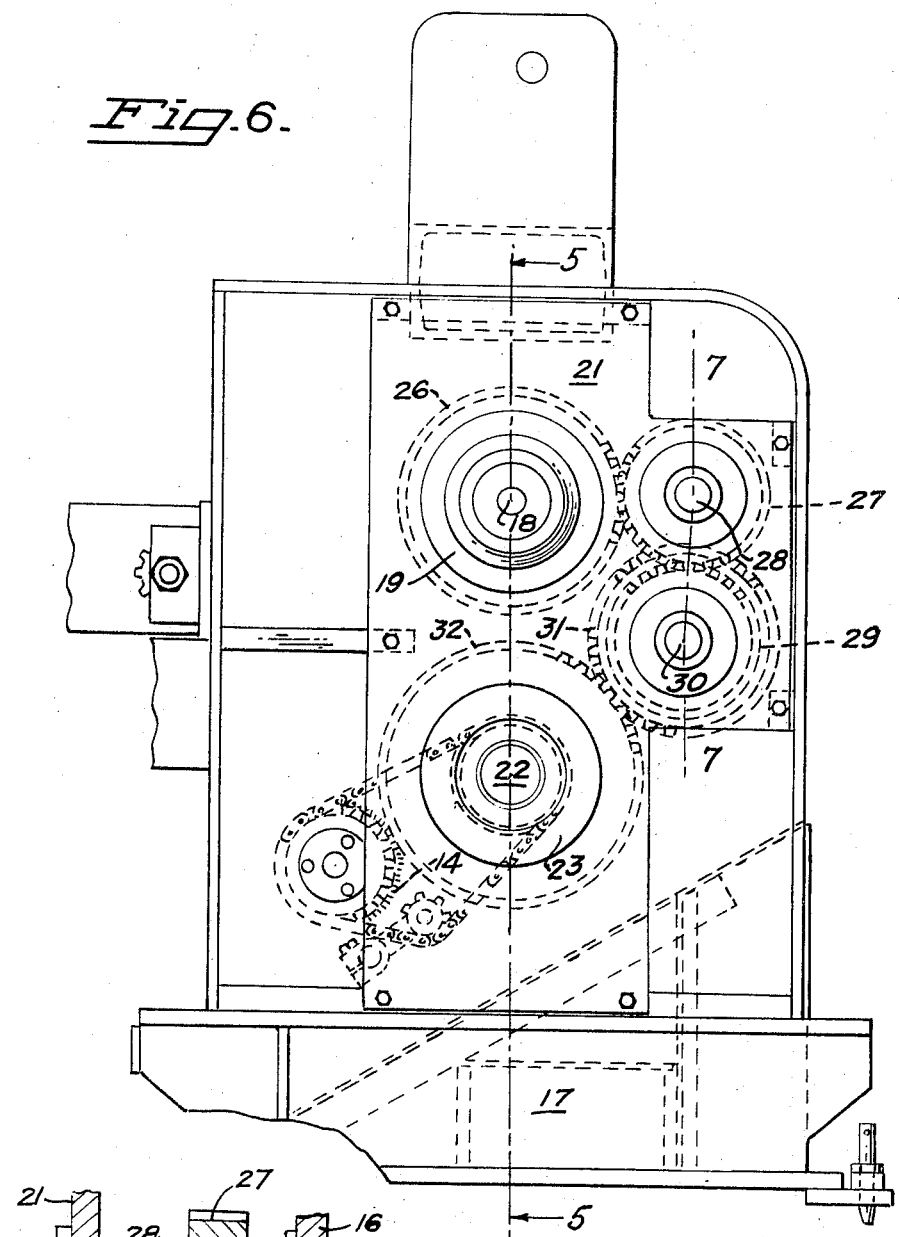
FIG. 6 is an end view of the transmission gearing of the rotary cutter device, viewed in the direction of arrows 6—6 of FIG. 5.
Figure 7:
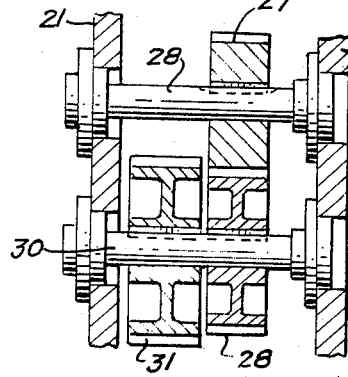
FIG. 7 is a sectional view of the transmission gearing, the section being taken on lines 7—7 of FIG. 6.

In the illustrative embodiment of the invention, I make use of a frame 1 in which is journalled a cutter roll 2, with a suitable cutting die 3 on its periphery, and an anvil roll 4. The rolls 2 and 4 are supported parallel with and along each other. In a second frame 6 is journalled a stripping roll 7, with a stripping punch 8 on its periphery, and a resiliently compressible stripping roll 9. The stripping roll 7 is in parallel registry with the cutter roll 2 and the resiliently compressible stripping roll 9 is in parallel registry with the anvil roll, so that blanks 11 from between the cutter roll 2 and the anvil roll 4 are fed toward and between the stripping rolls 7 and 9. The stripping punch 8 is angularly and circumferentially in registry with the cutting die 3, and the spacing between the two sets of rolls and the speed of feeding of the blanks 11 is so synchronized that the stripping punch 8 is aligned with the part of the blank 11 which was cut out by the cutting die 3 whenever a blank 11 passes between the stripper rollers. In this manner the cut-out 12 is pushed out of the blank 11 and stripped. Sets of suitable feed rollers 13 feed the blanks 11 along the device on the proper path, as shown in FIG. 1.

The anvil roll 4 of FIG. 1 has a resiliently compressible periphery such as rubber. But it may be a suitably firm brush roll 4' as shown in FIG. 2. The resiliently compressible stripping roll 9 is also a brush roll with generally radial bristles of suitable resiliency to eject the cut-out 12.

A rotating dusting brush 14 is in contact with the periphery of the anvil roll 4, and another dusting brush 14 is in contact with the periphery of the resiliently compressible stripping roll 9. The dusting brushes 14 strip off the trim or cut-out or other matter that may adhere respectively to the anvil roll 4 or stripping roll 9.

Suitable driving mechanism is provided, as hereinafter described, to rotate the rolls in synchronized timed relation.

The frame 1 has a pair of vertical bracket plates 16 fixed on a base 17. The cutter roll 2 has suitable means to mount the cutting die 3 thereon. A shaft 18 of the cutting roll is journalled in suitable bearings 19 in the plates 16. A box frame 21 is formed outside of each plate 16 and the shaft 18 is journalled also in said box frame 21.

The anvil roll 4 has its shaft 22 journalled in bearings 23 respectively in the bracket plates 16 and in the box frames 21. Each bearing 23 has an antifriction bearing bushing 24 fixed in its inside race against axial shifting for facilitating axial shifting of the anvil shaft 22 for laterally spreading the impressions made by the cutter die 3 on the periphery of the anvil roll 4.

In order to spread the cutting wear circumferentially on the anvil roll 4 a gear transmission of non-reducible ratio is provided for transmitting rotation from one roll to the other. The term non-reducible ratio herein indicates a gear transmission wherein the product of multiplication of the number of teeth of the respective driving gears of the transmission and the product of multiplication of the number of teeth of the respective driven gears of the transmission have no common denominator.

In the present illustration the cutter roll shaft 18 is driven by a driving gear 26 keyed on the shaft 18. A sprocket 25 on the hub of the driving gear 26 is suitably connected to a power drive, for instance to the driving mechanism of a so-called printer-slotter from which the blanks 11 are fed to the cutter device. The driving gear 26 has a prime number of teeth, namely in this illustration 53 teeth. The driving gear 26 is in mesh with an idler 27 on a shaft 28 in the adjacent box frame 21 parallel with and behind the cutter roll shaft 18. The idler 27 drives a driven gear 29 having 38 teeth and being keyed on a counter shaft 30 in the adjacent box frame 21, Another drive gear 31 having a prime number of 43 teeth is keyed on the counter shaft 30 and is in mesh with driven gear 32 having 61 teeth which latter is keyed to the anvil roll shaft 22.

Multiplying drive teeth times drive teeth and driven teeth times driven teeth, namely 53 x 43 and 38 x 61, the products form the non-reducible ratio of 2279:2318, which produces 2318 rows of cutting impressions on the periphery of the anvil roll 4 before an impression is superimposed on a previous impression.

To further spread the cutting wear a cam drive is provided in the other box frame 21 on the ends of roller shafts 18 and 22 opposite from the afordescribed transmission gearing, for shifting the anvil roll 4 axially, in this illustration about 4", and timing this lateral shift with the aforesaid drive ratio as follows: a prime cam driver gear 33 having 129 teeth keyed on the cutter shaft 18 in mesh with a prime driven cam gear 34 having 131 teeth rotatable on the anvil roll shaft 22. The cam gear 34 is made in two complemental vertical sections the adjacent faces of which are formed in parallel cam faces 36 for a 4" throw axially of the shaft 22. The cam faces 36 are spaced from one another and the spacing forms a cam groove. A follower disk 37 is keyed to the anvil roll shaft 22 and is held by lock rings 38 fixed on said shaft 22. A pair of diametrically opposite radial studs 38 extend from the periphery of the disk 37. A follower roller 39 is rotatably held on each stud 38 by a suitable washer 41 and lock nuts 42. The rollers 39 fit into the cam groove formed by the cam faces 36 so that as the cam gear 34 rotates it shifts the follower disk 37 and thereby shifts the anvil roll shaft 22 and the anvil roll 4 axially back and forth. For this purpose the key slot 43 in shaft 22 engaged by the key in the driven gear 32 is elongated to accommodate the shifting of the anvil roll shaft 22. The hubs 44 of the sections of the cam gear 34 abut against the respective bearings 23 and are held against axial movement. The hub 46 of the driven gear 32 is also held by the adjacent bearing 23 against axial displacement.

Thus with about 4" lateral shifting and with the ratio of cam drive above described, combined with the aforesaid non-reducible ratio of the transmission gearing, namely 2318 x 131, or driven times driven, 303,658 impressions are made by the cutting die 3 on the anvil roll 4 before repeating an impression on the same place. The principle of the non-reducible ratio in the transmission gearing is important.

The stripper rolls 7 and 9 are preferably driven by the same kind of transmission gearing and shift cam device as the cutter and anvil rolls 2 and 4, heretofore described.

The feed rollers 13 and the rotating brushes 14 are driven by suitable transmissions, not shown, suitably synchronized with the aforedescribed transmission gearings, by any suitable transmission mechanism.

In operation of the mechanism herein described the blanks 11 are fed into and through feed rollers 13 to and through the rotating cutting device and are cut by the cutting die 3, for instance to form a hole 47, shown in FIG. 4. The cut blank 11 is fed by and through other sets of feed rollers 13 to and through the stripper rollers 7 and 9 so that the stripper punch 8 pushes the cut-out 12 out of hole 47, and then the blank is carried away by feed rollers 13. Whatever trim may stick to the anvil roll 4 or to the second or lower stripper roll 9 is swept off by the adjacent rotating brush 14. The lower roll, or anvil roll 4, and resilient stripper roll 9 are respectively driven by such a ratio and are so shifted laterally during their respective rotation that the cutting die 4 or stripper punch 8 respectively strikes the periphery of the anvil roll 4 or resilient stripper roll 9 at different peripheral points at each revolution and thus spreads the wear, thereby materially prolonging the life of the respective rolls, assuring longer uninterrupted operation, greater accuracy in cutting blanks and improved overall efficiency of operation.

I claim:
1. In a rotary die cutter,
(a) a pair of spaced frames each formed by parallel vertical sides,
(b) a cutter roll between the frames,
(c) a cutting die on the cutter roll,
(d) an anvil roll between the frames,
(e) spaced parallel shafts extended beyond the ends of said rolls and being journalled in said vertical sides of said frames, forming a cutter roll shaft and an anvil roll shaft,
(f) driving and driven gears on the respective shafts,
(g) transmission gearing between said driving and driven gears connecting said shafts for rotating said rolls at a predetermined ratio, thereby to offset successive cutting members of said cutting die on said anvil roll,
(h) another driving gear rotated by the cutter roll shaft,
(i) an idler driven gear rotatable on the anvil roll shaft whereby said anvil roll shaft is movable axially relatively to said driven gear,
(j) the anvil roll shaft being movable axially relatively to said transmission gearing,
(k) and coacting cam means between said idler driven gear and said anvil roll shaft to reciprocate the anvil roll shaft and the anvil axially in predetermined ratio to said transmission gearing thereby to offset successive cutting impressions by said cutting die on said anvil roll.
2. The invention defined in claim 1 and said coacting cam means including,
(l) said idler driven gear forming a cam groove around said anvil roll shaft, the rise of said cam groove being axially offset relatively to said anvil roll shaft,
(m) a follower fixedly held on said anvil roll shaft and riding in said cam groove for reciprocating said anvil roll shaft,
(n) and means to hold said idler gear against axial movement.
3. The invention defined in claim 1
(l) said transmission gearing including a chain of driven and driving transmission gears between said driven and driving gears, the ratio between the product of multiplying the number of teeth of the driving gear by the number of teeth of the driving transmission gears in said chain of transmission gears, and the product of multiplying the number of teeth of the driven gear by the number of teeth of the driven transmission gears in said chain of transmission gears being non-reducible and each number of teeth on the respective gears being a prime number, thereby to further offset successive cutting impressions of said cutting die on said anvil roll.
4. The invention defined in claim 3 and said frames being box frames, and said transmission gearing being in one of said box frames, and said shifting gears and cam being in the other box frame.
5. In a rotary die cutter
(a) a support frame,
(b) a cutter roll rotatably supported on the frame,
(c) a cutting die on the cutter roll,
(d) an anvil roll rotatably supported on the frame adjacent to and alongside the cutter roll so that the cutting die works against the anvil roll for cutting a blank,
(e) the periphery of said anvil roll being resiliently compressible,
(f) a cylindrical brush rotatably supported on said support frame in firm contact with said compressible surface,
(g) and transmission means to rotate said cutter roll, said anvil roll and said brush at different speeds of rotation thereby to spread the location of cutting impressions on the anvil roll and to expose particles imbedded in said compressible periphery to the action of said brush,
(h) means driven by said transmisison means to shift said anvil roll axially during its rotation relatively to said cutter roll and to said brush, thereby to spread the location of impressions by said cutting die on said anvil roll laterally on the periphery of said anvil roll, and move said periphery axially relatively to said brush for lateral and radial brushing action.

6. The invention defined in claim 5, and
(i) said cylindrical brush being longer than said anvil roll, thereby contacting the entire length of said anvil roll during said lateral shifting of the anvil roll.

References Cited

UNITED STATES PATENTS

| | | | |
|---|---|---|---|
| 1,876,838 | 9/1932 | Biggert | 83—346 X |
| 2,142,728 | 1/1939 | Kienzle. | |
| 2,311,692 | 2/1943 | Potdevin | 83—168 X |
| 2,400,527 | 5/1946 | Aycock | 83—505 X |
| 3,263,882 | 8/1966 | Nugent et al. | 83—103 |
| 3,274,873 | 9/1966 | Sauer | 83—347 |

ANDREW R. JUHASZ, *Primary Examiner.*

U.S. Cl. X.R.

83—343, 561, 562, 659